E. Whitman
Wind Wheel.

No. 15,714. Patented Sep. 9, 1856.

UNITED STATES PATENT OFFICE.

EPHRAIM WHITMAN, OF ABINGTON, MASSACHUSETTS.

WINDMILL.

Specification of Letters Patent No. 15,714, dated September 9, 1856.

*To all whom it may concern:*

Be it known that I, EPHRAIM WHITMAN, of Abington, in the county of Plymouth and State of Massachusetts, have invented an Improved Windmill or Mechanism for Applying the Power of Wind to Operate Machinery; and I do hereby declare that the same is fully described and represented in the following specification and the accompanying drawings, of which—

Figure 2:
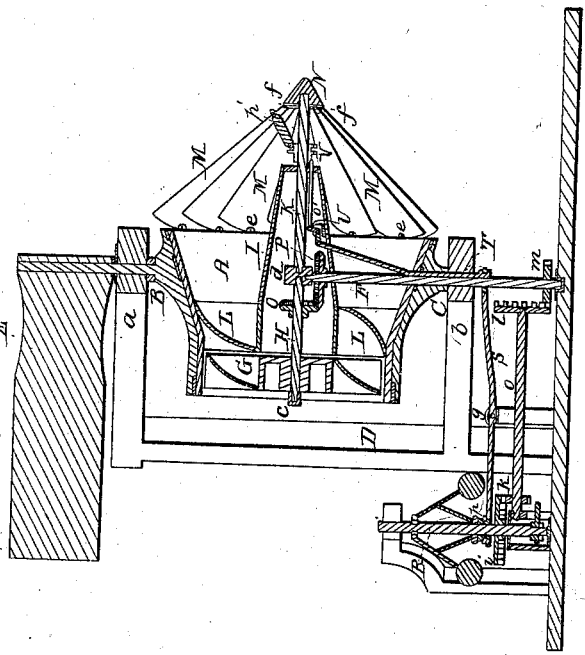
Figure 1:
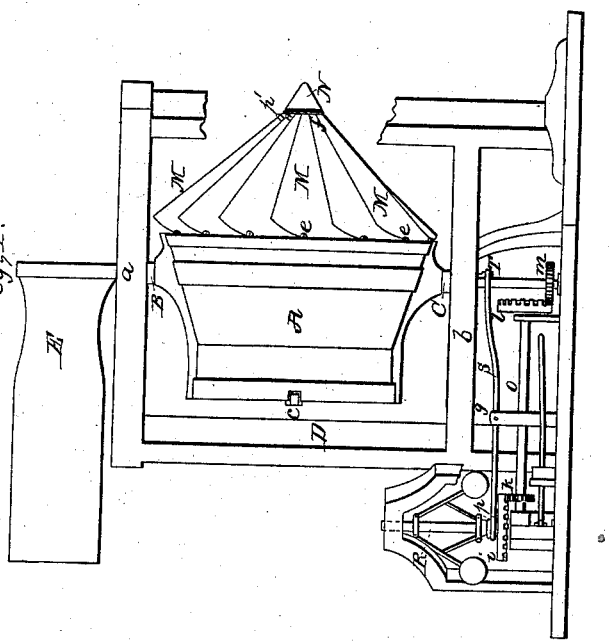
Figure 4:
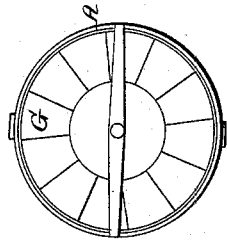
Figure 5:
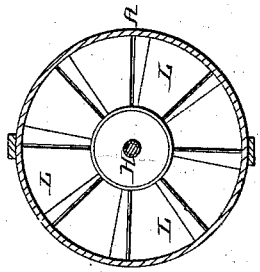
Figure 3:
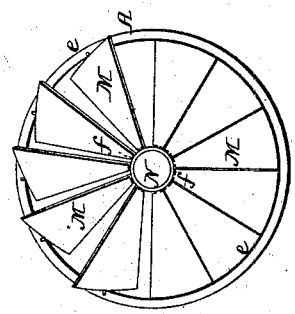

Figure 1 exhibits a side elevation of my said windmill; Fig. 2, a vertical, central and longitudinal section of it; Fig. 3, a front end view of its rotary flume and series of turning blinds. Fig. 4 is a rear end view of the said flume the same exhibiting the wind wheel, G, to be hereinafter described. Fig. 5 is a vertical and transverse section taken through the wind flume and so as to show its series of radial guide plates.

In these drawings, A, denotes the wind flume which is formed somewhat in the shape of a conic frustum open at both ends and from end to end, as shown in the drawings. From the opposite sides of the wind flume, journals B, C, extend vertically and are supported by and so as to rotate horizontally in the girts or horizontal timbers $a$, $b$, of a sustaining frame D. The upper journal B, has a vane E, attached to it, while the lower journal C, is made tubular in order to receive through its bore an upright shaft F which may be termed the "transferring shaft," as its object is to transfer power from the driving shaft of the wind wheel to any other shaft and particularly to that by which the ball governor to be hereinafter described is operated.

In the rear end of the wind flume, there is arranged a wind wheel, G, constructed essentially like the common "turbine" water wheel, the same being fixed upon a horizontal shaft H, whose journals are supported in cross bars $c$, $d$, one of which is attached to the flume and the other to a tubular tapering case I, which is arranged within said flume and concentrically around the shaft and a stationary shaft or rod K, as seen in Figs. 2 and 5.

Extending between the tubular tapering case I, and the inner surface of the wind flume A, is a series of guide plates L, L, L, whose office is to guide the wind into the buckets of the wind wheel G.

Besides the above, the rotary flume, A, is provided with a series of turning blinds or gates, M, M, M, which are arranged at its front end in manner as shown in the drawings, each of said blinds being formed fan shaped and so that when they are closed upon one another, they may entirely shut up the said front end of the wind flume so as to prevent air from being blown into the same sufficiently to put the wind wheel G in operation. Each of these blinds has a journal $e$, or $f$, extending from the middle of each of its ends, the said journals being supported in suitable bearings formed in the wind flume and in a conical head N, applied to the outer end of the stationary shaft K. The two shafts, H, and, F, have beveled gears O, P, applied to them, these gears being made to engage with one another, so that when the wind wheel is rotated the transferring shaft F, shall be put in revolution. In order to turn the blinds or gates in such manner as to regulate (that is to say, either to increase or diminish) the supply of air to the wind wheel in proportion as the force of the wind may be either diminished or increased I apply to said blinds an apparatus, which I shall now proceed to describe, it being what is usually termed a pendulum or swinging ball governor mechanism.

In the drawings, the ball governor is represented at R, and as having its sleeve $p$, applied to a rocker lever, S, whose fulcrum is at the top of a post $g$. By means of bevel gears $i$ $k$, $l$, $m$, and a shaft $o$, said governor receives rotary motion from the transferring shaft F, the action of the said governor upon the rocker lever S being well understood, that is to say the faster the governor is rotated the higher it will lift the arm of the rocker lever, S, with which it is connected. Any decrease in the speed of the governor will produce a consequent depression of said arm, and so as to raise the other arm of said lever. At the inner end of the lever S, the transferring shaft F, is made to pass through the lever and to have extending upward by the side of it and through the journal C, of the wind flume a rod T, whose lower part embraces that part of the lever S, that extends around the transferring shaft. The connection between the rod and the lever should be such as will not only enable the lever to move the rod vertically but to allow the rod T to be carried around with the journal C, during the horizontal movement of the latter. The upper end of the rod T, is jointed to one end of a bent rocker lever U, arranged within the tubular tapering case I, as shown in Fig. 2. On the stationary shaft or rod K, is a sliding sleeve V, which is connected with the lever U, by a pitman o, and also with one edge of each of the turning blinds by means of another such pitman p, so that when the sleeve is moved backward or away from the head N, it shall pull on the blind for the purpose of turning it in such manner as to close it more or less. A movement of the sleeve in the contrary direction, will cause the blind to be opened more or less and as each blind should be so connected with the sleeve, all will be simultaneously operated or turned either in one way or the other. Thus it will readily be seen how the ball governor and the blinds operate for the purpose of regulating the amount of air which may pass into the wind flume when its nose or conical head N, is turned in the direction from whence the wind may be blowing, the position of the wind flume being regulated by the action of the wind on its vane.

From the above it will be seen that the air, which passes into the flume will be directed into the buckets of the wheel, G, so as to put such wheel in revolution, also, that by the rotary motion of said wheel the transferring shaft F, will be revolved, and may be made to put in action any machinery with which it may be properly connected.

I claim—

1. The combination and arrangement of the rotary wind flume A, the series of turning blinds or gates M, and the wind wheel G, the whole being applied and made to operate together substantially as described.

2. And in combination with the wind flume A, and its wheel G, I claim the series of guide plates L, L, L, and the concentric tubular tapering case, I, arranged substantially in manner as herein before explained.

3. I also claim arranging the transferring shaft F, in the turning axis of the wind flume A, and so as to pass through the lower journal C, thereof, and thereby enable the wind flume and driving shaft H, and its beveled gear to revolve around such transferring shaft and the beveled gear thereof and transmit power through the shaft E, under any position of the rotary flume A.

In testimony whereof, I have hereunto set my signature this tenth day of July A. D. 1856.

EPHM. WHITMAN.

Witnesses:
WM. R. VINING,
CAROLINE H. WHITMAN.